(12) United States Patent
Akiyama

(10) Patent No.: US 10,408,499 B2
(45) Date of Patent: Sep. 10, 2019

(54) THERMOPHOTO CONVERSION ELEMENT

(71) Applicant: KYOCERA CORPORATION, Kyoto-shi, Kyoto (JP)

(72) Inventor: Masahide Akiyama, Kirishima (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/770,809

(22) PCT Filed: Oct. 25, 2016

(86) PCT No.: PCT/JP2016/081590
§ 371 (c)(1),
(2) Date: Apr. 25, 2018

(87) PCT Pub. No.: WO2017/073564
PCT Pub. Date: May 4, 2017

(65) Prior Publication Data
US 2018/0313580 A1 Nov. 1, 2018

(30) Foreign Application Priority Data
Oct. 26, 2015 (JP) ................................. 2015-209928

(51) Int. Cl.
F24V 99/00 (2018.01)
(52) U.S. Cl.
CPC ................... F24V 99/00 (2018.05)

(58) Field of Classification Search
CPC ...................................................... F24V 99/00
See application file for complete search history.

(56) References Cited

U.S. PATENT DOCUMENTS

| 7,745,832 | B2* | 6/2010 | Hsieh | H01L 33/641 |
| | | | | 257/706 |
| 2005/0029538 | A1* | 2/2005 | Choi | H01L 51/52 |
| | | | | 257/103 |
| 2007/0090293 | A1 | 4/2007 | Ichihara et al. | |
| 2014/0036953 | A1* | 2/2014 | Kimura | G01J 5/16 |
| | | | | 374/121 |

FOREIGN PATENT DOCUMENTS

| CN | 1886820 A | 12/2006 | |
| EP | 1679735 A1 | 7/2006 | |
| JP | 2014-217110 A | 11/2014 | |
| WO | WO-2013132819 A1 * | 9/2013 | ......... B29D 99/0089 |

OTHER PUBLICATIONS

Yuki Ogawa, "Policy to prevent global warming", Economic Policy Research, Mar. 2006, No. 2, p. 229-247 and 46 pages of its English translation.

* cited by examiner

Primary Examiner — Marcus H Taningco
(74) Attorney, Agent, or Firm — Viering, Jentschura & Partner MBB

(57) ABSTRACT

A base is metal, ceramic, or a complex combining thereof, and has thereon multiple concave-convex patterns that are provided at one or more pitches equal to or less than 2 μm, and a surface part 1a of the base 1 is porous.

7 Claims, 5 Drawing Sheets

THERMOPHOTO CONVERSION ELEMENT

CROSS-REFERENCE TO RELATED APPLICATIONS

This application is a national stage entry according to 35 U.S.C. 371 of PCT Application No. PCT/JP2016/081590 filed on Oct. 25, 2016, which claims priority to Japanese Application No. 2015-209928 filed on Oct. 26, 2015, which are entirely incorporated herein by reference.

TECHNICHAL FIELD

This disclosure relates to a thermophoto conversion element.

BACKGROUND

Since the Industrial Revolution that began in the 18th century, various industries have developed. On earth, the amount of fossil fuels consumed has been increasing. This leads to a situation where discharged carbon dioxide gas remains up in the air and it exerts a role as greenhouse effect gas. On the ground, due to concrete buildings or asphalt roads, cooling actions on the ground have been degraded. For this reason, air-conditioners have been used more and more. As infrared rays due to radiation from concrete and asphalt are absorbed by air and clouds, it is difficult to release energy out of the earth. This results in a vicious cycle where an increase in the amount of fossil fuels used causes a further increase in greenhouse effect gas (for example, see Non Patent Literature 1). In a current situation, there are no definite technologies to decrease temperature of the ground and objects existing there.

Non Patent Literature 1: Yuki Ogawa, "Policy to prevent global warming", Economic Policy Research, March 2006, No. 2, p.229 to 247

DETAILED DESCRIPTION

Figure 1A:
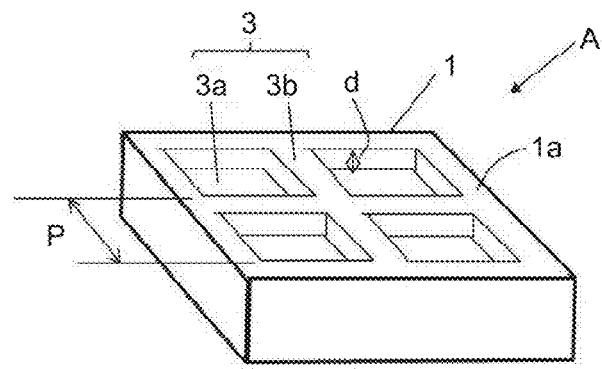
FIG. 1A is a perspective view that schematically illustrates a thermophoto conversion element A having cavities on a surface of a base according to a first embodiment.
Figure 1B:
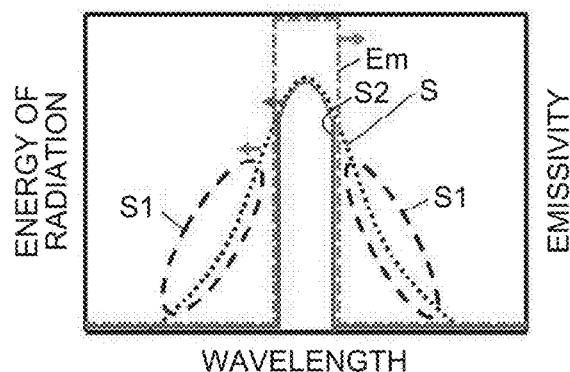
FIG. 1B is a graph that schematically illustrates emission characteristics of the thermophoto conversion element A illustrated in FIG. 1A.

FIG. 1A is a perspective view that schematically illustrates a thermophoto conversion element A having cavities formed by a recess-protrusion pattern on a surface of a base according to a first embodiment, FIG. 1B is a graph that schematically illustrates emission characteristics of the thermophoto conversion element A illustrated in FIG. 1A.

As illustrated in FIG. 1A, for example, the thermophoto conversion element A according to the first embodiment has a configuration such that multiple recess-protrusion patterns 3 are provided at a pitch P of equal to or less than 2 µm, each of the recess-protrusion patterns 3 having a recessed portion 3$a$ and a protruding portion 3$b$, and on a surface part 1$a$ of a base 1 that is a hexahedron. Specifically, in the thermophoto conversion element A, the recess-protrusion pattern 3 is formed by forming the recessed portion 3$a$ with a predetermined interval on the upper surface side of the base 1. In the base 1, the surface part 1$a$ including the top surface and the four side surfaces forming at least the recessed portion 3$a$ is porous. In this case, porosity means that a part has a porosity of equal to or more than 1%. The surface part 1$a$ of the base 1 refers to an area where a part with porosity of equal to or more than 1% is formed with substantially a certain thickness on the surface of the base 1. Hereafter, the part is sometimes referred to as a porous layer. Parts other than the porous layer have a porosity of equal to or less than 0.8%.

With the thermophoto conversion element A, when the base 1 receives heat, the recess-protrusion pattern 3 converts the heat into light at a specific wavelength (e.g., a wavelength of 10 µm) as illustrated in FIG. 1B, and it is emitted upward with desired directional characteristics.

The effect of the thermophoto conversion element A is explained by using FIG. 1B. In FIG. 1B, the horizontal axis represents a wavelength, the vertical axis on the left side represents the amount of changes in energy of radiation, and the vertical axis on the right side represents changes in emissivity. The emitted spectrum (reference mark S) indicated by a dashed line in FIG. 1B is changes in energy of a typical object without any limitation on emission wavelengths.

In the thermophoto conversion element A, the top surface of the base 1, which is a hexahedron, has a recessed and protruding structure as described above; therefore, the emitted spectrum (reference mark S2) is obtained which has a form such that a spectrum part (here, reference mark S1) based on black-body radiation is reduced from the emitted spectrum (the reference mark S) of a typical object. Thus, the wavelength of light emitted is limited, and high emissivity (reference mark Em) is exhibited within a range of the specific wavelength.

Typically, most of infrared rays due to radiation that occurs from heat that remains on the ground or objects existing there are absorbed by clouds and water up in the air and therefore they stay near the ground. However, if the emitted spectrum of an object is like the spectrum S2 illustrated in FIG. 1B where it is limited to a range of the specific wavelength that is not absorbed by clouds and water, the heat remaining on the ground or objects existing on the ground may be released high from the ground.

In this case, as the surface part 1a of the base 1 is porous, the base 1 is unlikely to release heat due to convection and heat transfer. Thus, it is possible to improve an efficiency of conversion from heat received by the base 1 into light.

The reason why the surface part 1a of the base 1 has a low heat release performance due to porosity is that the size of pores (the maximum dimension (diameter) of open pores) forming the porous layer is small, equal to or less than 10 nm. It is because most (equal to or more than 90%) of the microscopic pores are located with an interval of equal to or more than twice and equal to or less than five times the maximum dimension. Therefore, heat is unlikely to be released from the pores forming the porous layer. It is considered that the large number of pores function as a heat-insulating layer in the surface part 1a of the base 1. In this case, the thickness of the porous layer may be equal to or more than 5 nm and equal to or less than 30 nm in a non-limiting embodiment for the reason that its function as a heat-insulating layer in the surface part 1a may be improved.

FIG. 1A illustrates a state where the surface part 1a of the base 1 itself is porous; however, this is not a limitation, and a configuration may be such that a porous membrane, which is made of different material, is attached to the surface part 1a of the base 1.

The entire exposed surface of the base 1 may be porous for the reason that heat insulating properties of the base 1 may be improved; however, this is not a limitation, and a configuration may be such that, for example, it is partially provided on the upper surface side of the base 1 where the recessed portion 3a is formed.

With the thermophoto conversion element A, the wavelength at which the energy of radiation exhibits the largest value may be changed by altering at least one of the pitch P of the recess-protrusion pattern 3 and depth d of the recessed portion 3a.

The reason why the pitch of the recess-protrusion pattern 3 is equal to or less than 2 μm in the recess-protrusion pattern 3 is that, depending on the wavelength of light emitted, the efficiency of conversion from heat to light is decreased if the pitch is more than that.

The base 1 included in the thermophoto conversion element A may be at least one type of material selected from the group consisting of tungsten, molybdenum, silicon carbide, aluminum oxide, ytterbium oxide, and erbium oxide in a non-limiting embodiment. If a porous layer is attached to the surface part 1a of the base 1, a membrane made of the same material may be used in a non-limiting embodiment. The porous layer may include organic resin.

Figure 2:
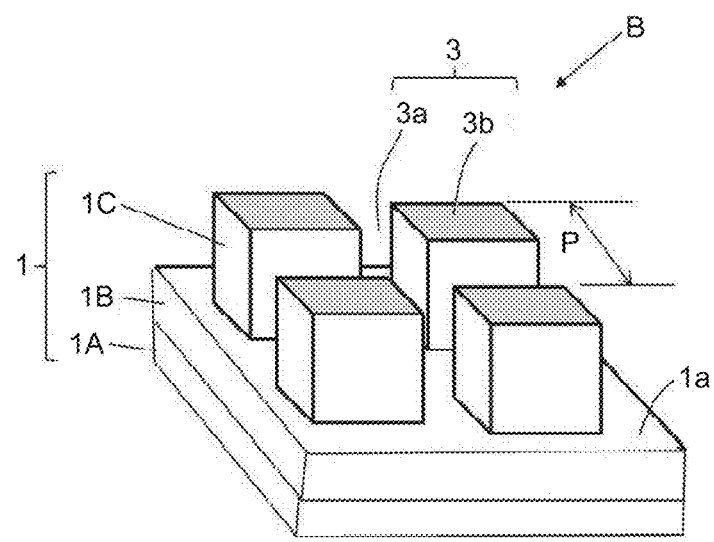
FIG. 2 is a perspective view that schematically illustrates a thermophoto conversion element B according to a second embodiment in a case where the part for converting heat into light has a three-layer structure of a metallic layer-a dielectric layer-a metallic layer.

FIG. 2 is a perspective view that schematically illustrates a thermophoto conversion element B according to a second embodiment in a case where the part for converting heat into light has a three-layer structure of a first metallic layer—a dielectric layer—a second metallic layer. In the thermophoto conversion element B according to the second embodiment, the base 1 is formed with a three-layer structure of a first metallic layer 1A, a dielectric layer 1B, and a second metallic layer 1C. The thermophoto conversion element B according to the second embodiment has a structure such that the second metallic layers 1C including the protruding portions 3b are arranged on the upper surface of the flat-plate like dielectric layer 1B. In this case, each recessed portion 3a is formed in the gap between the corresponding second metallic layers 1C, and the recess-protrusion pattern 3 is formed between the dielectric layer 1B and the second metallic layer 1C. In other words, the protruding portion 3b is formed by the second metallic layer 1C, and the bottom surface of the recessed portion 3a is formed by the dielectric layer 1B.

In the thermophoto conversion element B according to the second embodiment, when the first metallic layer 1A receives heat from underneath, the dielectric layer 1B has the effect of enclosing light so that the heat may be converted into light. In this case, too, surface part 1a of the base 1 may be porous in a non-limiting embodiment. Specifically, in the thermophoto conversion element B, the entire exposed surfaces of the first metallic layer 1A, the dielectric layer 1B, and the second metallic layer 1C may be porous layers in a non-limiting embodiment for the reason that heat insulating properties of the base 1 may be improved. Thus, in the case of the thermophoto conversion element B, too, thermophoto conversion characteristics are exhibited as illustrated in FIG. 1B.

Figure 3A:
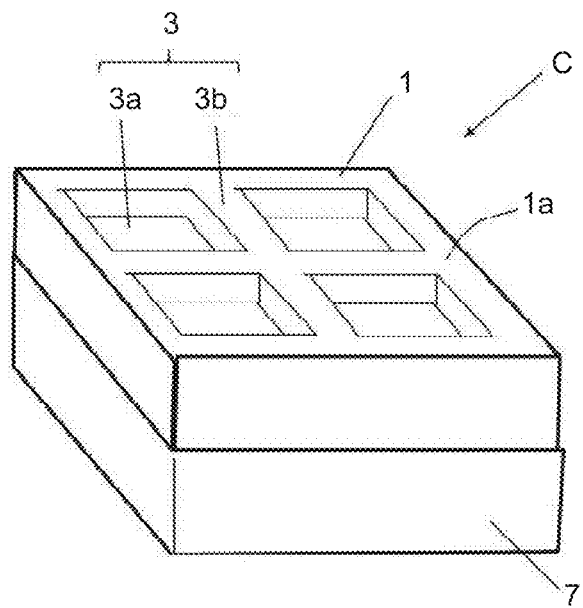
FIG. 3A is a perspective view that schematically illustrates a thermophoto conversion element C according to a third embodiment where a heat absorbing member is provided under the base included in the thermophoto conversion element A according to the first embodiment.
Figure 3B:
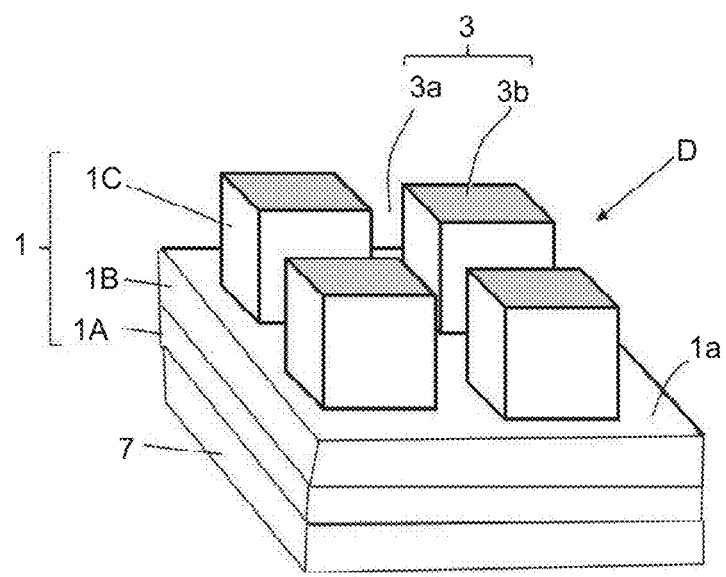
FIG. 3B is a perspective view that schematically illustrates a thermophoto conversion element D according to a fourth embodiment where a heat absorbing member is provided under the base included in the thermophoto conversion element B according to the second embodiment.

FIG. 3A is a perspective view that schematically illustrates a thermophoto conversion element C according to a third embodiment where a heat absorbing member is provided under the base included in the thermophoto conversion element A according to the first embodiment. FIG. 3B is a perspective view that schematically illustrates a thermophoto conversion element D according to a fourth embodiment where a heat absorbing member is provided under the base included in the thermophoto conversion element B according to the second embodiment.

The thermophoto conversion elements C, D have a configuration such that a heat absorbing member 7 is provided under the base 1, which is the thermophoto conversion element A, B. With this configuration, even if a surface contact between the base 1 and the surface of an installed area (hereafter, sometimes referred to a heated area) is difficult, a surface contact between the heat absorbing member 7 and the surface of the heated area is possible. Thus, the base 1 may be provided on a heated area in a stable manner. Thus, even if the surface of a heated area has a complex shape, the thermophoto conversion elements C, D exhibiting high thermophoto conversion efficiency may be obtained.

In this case, the material of the heat absorbing member 7 may be metallic material or ceramic in a non-limiting embodiment because of high heat conductivity. Among them, metallic material may be preferable, in a non-limiting embodiment, in terms of desired workability, easy fitting into shape of the surface of a heated area, and flexibility with large areas. The metallic material may have any of copper, nickel, and iron as its principal component, alloy such as corrugated galvanised iron or stainless steel, or a combination thereof in a non-limiting embodiment.

Figure 4A:
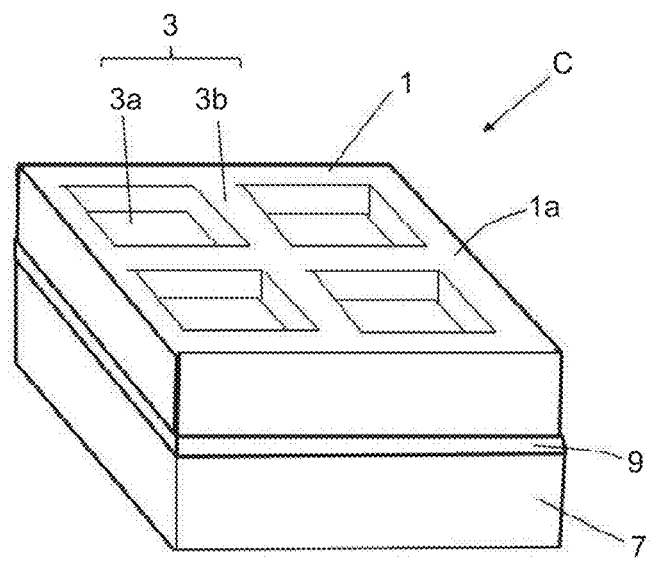
FIG. 4A illustrates a state where a metallic membrane is interposed between the base and the heat absorbing member included in the thermophoto conversion element C according to the third embodiment illustrated in FIG. 3A.

FIG. 4A illustrates a state where a metallic membrane is interposed between the base and the heat absorbing member included in the thermophoto conversion element C according to the third embodiment illustrated in FIG. 3A, and FIG.

4B illustrates a state where an adhesion layer is interposed between the base and the heat absorbing member included in the thermophoto conversion element D according to the fourth embodiment illustrated in FIG. 3B.

Figure 4B:
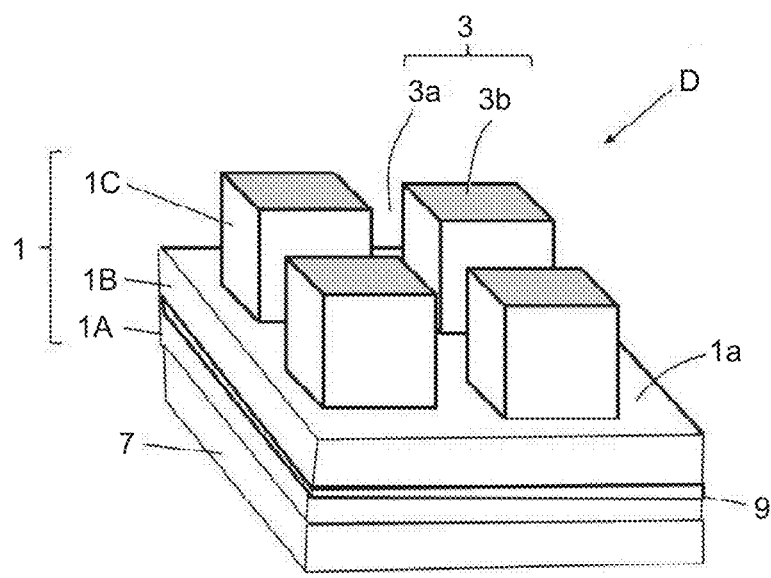
FIG. 4B illustrates a state where an adhesion layer is interposed between the base and the heat absorbing member included in the thermophoto conversion element D according to the fourth embodiment illustrated in FIG. 3B.

With regard to the thermophoto conversion element C according to the third embodiment and the thermophoto conversion element D according to the fourth embodiment, as illustrated in FIG. 4A and FIG. 4B, the base 1 and the heat absorbing member 7 may be attached through an adhesion layer 9 in a non-limiting embodiment. In this case, adhesion layer 9 itself may be adhesive in a non-limiting embodiment. With this configuration that the adhesion layer 9 is interposed between the base 1 and the heat absorbing member 7, even if both the base 1 and the heat absorbing member 7 are made of material with a high degree of elasticity, adhesiveness between the base 1 and the heat absorbing member 7 may be increased. In this case, in a non-limiting embodiment, the material of the adhesion layer 9 may be any of metal, metallic oxide, and a complex material thereof because of an increase in heat conductivity of the adhesion layer 9. If they are used as the adhesion layer 9, their functions as the adhesion layer 9 are implemented by adjusting the melting point of these materials. As above, the thermophoto conversion elements A to D illustrated in FIGS. 1 to FIG. 4 have a function to convert heat generated from any object into light at a specific wavelength and emit it.

Figure 5A:
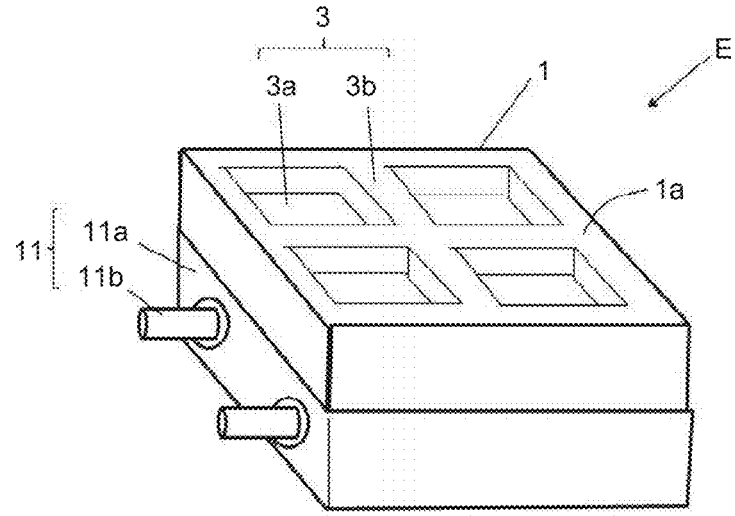
FIG. 5A is a perspective view that schematically illustrates a thermophoto conversion element E according to a fifth embodiment where a heat generating member with a terminal for external connection is provided under the thermophoto conversion element A according to the first embodiment.
Figure 5B:
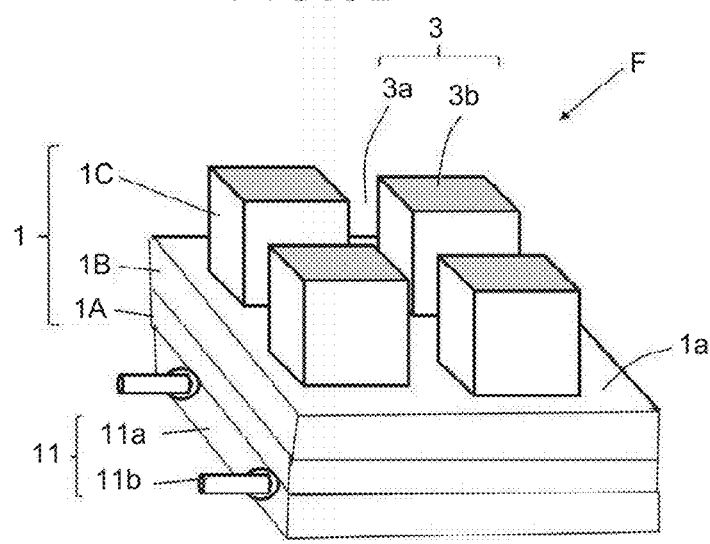
FIG. 5B is a perspective view that schematically illustrates a thermophoto conversion element F according to a sixth embodiment where a heat generating member with a terminal for external connection is provided under the thermophoto conversion element B according to the second embodiment.
Figure 6:
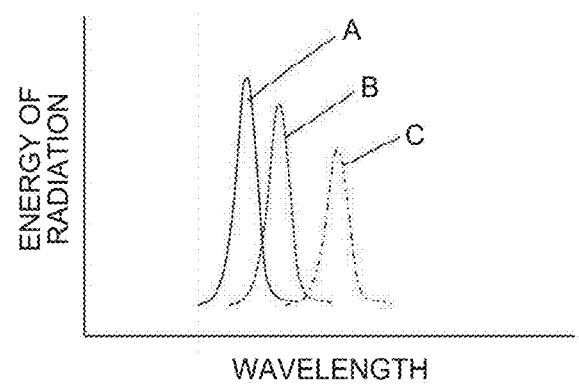
FIG. 6 is an image of the emission characteristics obtained by the thermophoto conversion element E according to the fifth embodiment.

FIG. 5A is a perspective view that schematically illustrates a thermophoto conversion element E according to a fifth embodiment where a heat generating member with a terminal for external connection is provided under the thermophoto conversion element A according to the first embodiment. FIG. 5B is a perspective view that schematically illustrates a thermophoto conversion element F according to a sixth embodiment where a heat generating member with a terminal for external connection is provided under the thermophoto conversion element B according to the second embodiment. FIG. 6 is an image of the emission characteristics obtained by the thermophoto conversion element E according to the fifth embodiment.

The thermophoto conversion element C according to the third embodiment and the thermophoto conversion element D according to the fourth embodiment illustrated in FIG. 3A and FIG. 3B are provided with the member that passively absorbs heat under the base 1 having a thermophoto conversion function. In the thermophoto conversion element E according to the fifth embodiment and the thermophoto conversion element F according to the sixth embodiment illustrated in FIG. 5A and FIG. 5B, a heat generator 11a includes an external terminal 11b so that it generates heat by itself (here, referred to as a heat generating member 11). The heat generating member 11 has a function to increase the temperature of the heat generator 11a due to energy (e.g., electric power) supplied from the external terminal 11b. For example, if the heat generating member 11 is provided under the base 1 that has a thermophoto conversion function, the heat generated by the heat generating member 11 may be output by the base 1 as light that has a specific wavelength. In the above-described thermophoto conversion elements E, F, wavelengths (graphs A, B, C in FIG. 6) at which energy of radiation exhibits the largest value may be changed by changing output of the heat generating member 11, changing the pitch P of the recess-protrusion pattern 3 in the base 1, or the like.

For example, the resonance wavelength (frequency) of a molecule that is bonded atoms is different depending on the bond distance. Raw ceramic compacts are used as an example: raw ceramic compacts often contain organic molecules with different molecule chain lengths as well as ceramic powder.

If the above raw ceramic compact is degreased, organic molecules are simultaneously volatilized during a typical heating-type degreasing process, and therefore cracks easily occur in the raw ceramic compact.

In such a case, if the thermophoto conversion element E according to the fifth embodiment or the thermophoto conversion element F according to the sixth embodiment is used during the degreasing process, the wavelength at which energy of radiation exhibits the largest value may be changed; therefore, in raw ceramic compacts, only a specific organic molecule may be sequentially volatilized while ceramic powder and other organic molecules are prevented from being heated. Thus, it is possible to prevent the occurrence of cracks in raw ceramic compacts during degreasing.

With the thermophoto conversion elements E, F, the rate of volatilization of organic constituents from raw ceramic compact may be controlled. Thus, it is possible to manufacture a degreasing device that is capable of further reducing the occurrence of cracks. In this case, as the surface part 1a of the base 1 included in the thermophoto conversion elements E, F is porous, heat transfer (convection) in the air may be prevented. Thus, the thermophoto conversion efficiency of the degreasing device may be improved.

Figure 7:
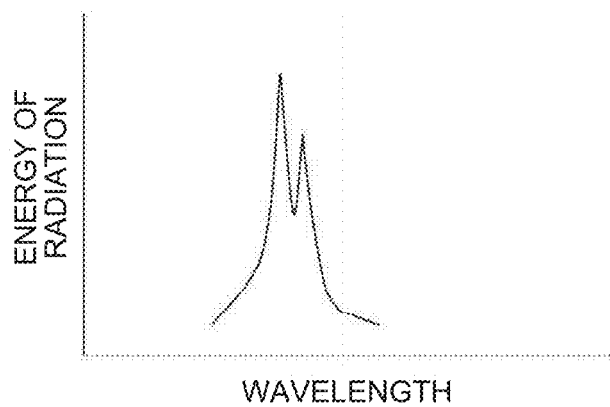
FIG. 7 is an image of the emission characteristics obtained when the base having the recess-protrusion pattern with a different pitch is applied to the thermophoto conversion element E according to the fifth embodiment.

FIG. 7 is an image of the emission characteristics obtained when the base having the multiple recess-protrusion patterns 3 provided at two or more pitches is applied to the thermophoto conversion element E according to the fifth embodiment. For example, if the base 1 having the recess-protrusion pattern 3 provided at two or more pitches P is used, output energy of radiation has peaks P as illustrated in FIG. 7, and organic molecules may be simultaneously oscillated and volatilized.

The thermophoto conversion element is manufactured so as to have a configuration illustrated in table 1 and its emission characteristics are evaluated below. In this case, an alumina ceramic heater including a tungsten conductor wire as a resistor body is used as a heat generating member. The external size of the alumina ceramic heater is 10 mm×10 mm×3 mm in height, width, and depth. The base 1 is manufactured to be 10 mm×10 mm×0.1 mm in height, width, and depth. The base 1 including the recess-protrusion pattern 3 is manufactured by using a Tungsten plate through processing according to a laser ablation technique using a mask. The recess-protrusion pattern 3 is obtained such that the pitch is 1.5 µm, the width of the recessed portion 3a is 1.2 µm, the depth of the recessed portion is 1 µm, and the width of the protruding portion is 0.3 µm. The surface of the base 1 is subjected to dry etching to form pores 5a whose average diameter is 10 nm (the depth is also about 10 nm) so as to be porous.

As for the base 1, the base 1 is manufactured such that the recess-protrusion pattern where the pitch is 1.5 µm, the width of the recessed portion 3a is 1.2 µm, the depth of the recessed portion is 1 µm, and the width of the protruding portion is 0.3 µm and the recess-protrusion pattern 3 where the pitch is 1 µm, the width of the recessed portion 3a is 0.8 µm, the depth of the recessed portion is 1 µm, and the width of the protruding portion is 0.3 µm are alternately mixed, and they are evaluated in the same manner (samples where the recess-protrusion patterns are mixed).

The base 1 including the first metallic layer 1A—the dielectric layer 1B—the second metallic layer 1C is manufactured according to a sputtering technique by using tungsten for the first metallic layer 1A and the second metallic layer 1C and SiO$_2$ for the dielectric layer. It is manufactured such that the pitch of the second metallic layer 1C is 2 μm and the width of the protruding portion 3b of the second metallic layer 1C is 1 μm. For the adhesion layer 9, an adhesive (Aron Ceramic: manufactured by Toagosei) including alumina powder is used.

The temperature of the heat generating member 11 for measuring emission characteristics is set so as to reach 600° C. and 900° C. Infrared spectrometers are used for measurement of emission characteristics.

The infrared emissivity of the above samples manufactured is obtained and, with regard to each of samples No. 1 to 7, it is equal to or more than 80%, which is higher by equal to or more than 35% than a base with a flat top surface. The infrared emissivity is a value represented as a ratio of infrared emission energy to input energy (a unit is watt (W)). Input energy is a value obtained from calculation on the current flowing into a heater. In this case, energy other than infrared emission energy is released outside the system by heat loss due to convection and heat transfer. Infrared emission energy is measured by using an infrared spectrometer.

TABLE 1

| Sample No. | Basic structure of thermophoto conversion element | Presence or absence of adhesion layer | Temperature of heat generating member ° C. | Peak position of energy of radiation Wavelength (μm) | Half-value width of radiation energy peak Wavelength (μm) |
|---|---|---|---|---|---|
| 1 | FIG. 5A | Absent | 600 | 1.5 | 0.4 |
| 2 | FIG. 5A | Absent | 900 | 1.5 | 0.2 |
| 3 | FIG. 5A | Absent | 900 | 1.5 | 0.2 |
| 4 | FIG. 5A | Present | 900 | 1.5 | 0.18 |
| 5 | FIG. 5B | Present | 900 | 1.5 | 0.18 |
| 6 | FIG. 5B (Recess-protrusion pattern mixed) | Absent | 900 | 1.3, 1.5 | 0.5 |
| 7 | FIG. 5B (Recess-protrusion pattern mixed) | Present | 900 | 1.3, 1.5 | 0.45 |

As it is obvious from the result in Table 1 that each of the samples (No. 1 to 7) manufactured based on the structure of FIG. 5A or FIG. 5B exhibits emission characteristics. Among them, the samples (the samples No. 4, 5, and 7) with the adhesion layer 9 formed between the base 1 and the heat generating member 11 obtain the same half-value width of energy of radiation as those of the samples (the samples No. 1 to 3 and 6) without the adhesion layer 9.

According to these results, it is understood that the manufactured base 1 performs a function to convert heat from a heated object into light at a specific wavelength and emit it. Thus, it is considered that if buildings on the ground or asphalt roads are filled with it, the effect of heat release is exhibited.

With the structure of the sample No. 1, a sample with the surface part 1a of the base 1 being dense instead of being porous was manufactured; however, in this case, compared with the sample No. 1, the amount of heat released from the base 1 is large, and the ratio of energy of radiation to the amount of heat released is small by about 35%.

Additional advantages and modifications will readily occur to those skilled in the art. Therefore, the invention in its broader aspects is not limited to the specific details and representative embodiments shown and described herein. Reference to numerical embodiments, e.g., the first embodiment to the sixth embodiment, used to describe various embodiments as described herein, one skilled in the art would recognize that various features in the disclosure are not necessarily mutually exclusive, as some aspects of the disclosure may be combined with one or more other embodiments and aspects of the disclosure. Accordingly, various modifications may be made without departing from the spirit or scope of the general inventive concept as defined by the appended claims and their equivalents.

What is claimed is:

1. A thermophoto conversion element comprising:
   a base comprising a metal, ceramic, or a combination thereof, and has thereon multiple patterns that are provided at one or more pitches equal to or less than 2 μm, each of the multiple patterns comprising a recess and a protrusion, wherein a surface part of the base is porous.

2. The thermophoto conversion element according to claim 1, wherein
   the base comprises a plurality of cavities.

3. The thermophoto conversion element according to claim 1, wherein
   the base has a three-layer structure comprising a first metallic layer, a dielectric layer, and a second metallic layer, the second metallic layer comprising the protrusions, and
   the recesses formed as gaps between the protrusions.

4. The thermophoto conversion element according to claim 1, wherein
   a heat absorbing member is arranged on a surface of the base that is opposed to a surface on which the multiple patterns are provided.

5. The thermophoto conversion element according to claim 4, wherein
   the base and the heat absorbing member are attached by an adhesion layer.

6. The thermophoto conversion element according to claim 1, wherein
   a heat generating member is arranged on a surface of the base that is opposed to a surface on which the multiple patterns are provided.

7. The thermophoto conversion element according to claim 1, wherein
   the multiple patterns are provided at two or more pitches.

* * * * *